US006947415B1

(12) United States Patent
Nagaraj

(10) Patent No.: US 6,947,415 B1
(45) Date of Patent: Sep. 20, 2005

(54) METHOD AND APPARATUS FOR PROCESSING PACKETS IN A ROUTING SWITCH

(75) Inventor: Alwarkurichi Padmana Nagaraj, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/293,464

(22) Filed: Apr. 15, 1999

(51) Int. Cl.[7] .......................... H04L 12/56; H04L 12/26
(52) U.S. Cl. ..................... 370/389; 370/252; 370/413; 370/395.31; 709/242
(58) Field of Search ................................ 370/356, 360, 370/363, 368, 371, 374, 378, 381, 389, 390, 392, 397, 398, 399, 395.21, 395.3, 395.32, 252, 395.31, 254, 411–419, 351–355, 400–402; 709/238, 242, 244; 707/509, 1, 8; 359/114, 117, 118; 398/42, 58, 49, 51

(56) References Cited

U.S. PATENT DOCUMENTS

| | | | | |
|---|---|---|---|---|
| 4,692,917 A | * | 9/1987 | Fujioka | 370/392 |
| 5,249,178 A | * | 9/1993 | Kurano et al. | 370/392 |
| 5,265,092 A | * | 11/1993 | Soloway et al. | 370/254 |
| 5,416,769 A | * | 5/1995 | Karol | 370/414 |
| 5,513,172 A | * | 4/1996 | Shikama et al. | 370/412 |
| 5,535,197 A | * | 7/1996 | Cotton | 370/414 |
| 5,754,790 A | * | 5/1998 | France et al. | 709/242 |
| 5,781,549 A | * | 7/1998 | Dai | 370/398 |
| 5,784,367 A | * | 7/1998 | Sannino | 370/392 |
| 5,802,316 A | * | 9/1998 | Ito et al. | 370/351 |
| 5,848,059 A | * | 12/1998 | Yamamoto | 370/420 |
| 5,917,805 A | * | 6/1999 | Manning et al. | 370/414 |
| 5,987,008 A | * | 11/1999 | Simpson et al. | 370/418 |
| 6,069,895 A | * | 5/2000 | Ayandeh | 370/389 |
| 6,073,248 A | * | 6/2000 | Doshi et al. | 359/118 |
| 6,111,673 A | * | 8/2000 | Chang et al. | 370/392 |

* cited by examiner

Primary Examiner—Steven Nguyen

(57) ABSTRACT

A method, apparatus, and instructions for processing packets within a routing switch uses a multiprocessor architecture. The routing switch includes a switch fabric, a Routing Table Processing Unit, at least one packet buffer for queuing incoming and outgoing packets, at least one Packet Processing Unit, and a shared memory for storing a routing table. A Packet Processing Unit retrieves packets from a packet buffer memory, which may be a shared memory accessible to more than one of the Packet Processing Units depending upon the internal configuration of the components. The Packet Processing Unit categorizes the packets into routing information packets and data packets. The Packet Processing Unit forwards a routing information packet to a Routing Table Processing Unit and processes any other data packet by retrieving forwarding information from a routing table, updating the packet with the retrieved forwarding information, and forwarding the updated packet using a switch fabric connected to the Packet Processing Unit. A locking mechanism within the routing table memory provides synchronization between the activities of the various processing units. In response to receiving a routing information packet, the Routing Table Processing Unit locks a portion of the routing table, updates the locked portion of the routing table with information from the routing table information packet, and then unlocks the locked portion of the routing table. The Packet Processing Unit waits for a necessary portion of the routing table to be unlocked before retrieving any forwarding information. If more than one packet buffer memory is employed, the routing switch may be configured to support a wavelength division multiplexed (WDM) enabled network such that each input/output interface receives packets over a particular wavelength and queues the packets within separate packet buffers.

21 Claims, 6 Drawing Sheets

METHOD AND APPARATUS FOR PROCESSING PACKETS IN A ROUTING SWITCH

FIELD OF THE INVENTION

The present invention relates generally to data transport and, in particular, to a method and apparatus for sending and receiving data packets in a routing switch.

BACKGROUND OF THE INVENTION

With the explosive growth of data traffic on the Internet and corporate enterprise networks, corporations and Internet Service Providers (ISPs) demand faster routing switches that can meet the increasing traffic demands. However, in order to provide a high-speed device at a reasonable cost, manufacturers of routers and switches have generally met the demands for faster packet processing speeds and the demands of higher communication bandwidth by improving the hardware processing speed of each component within the routers and switches. With the advent of optical networks, this methodology is beginning to fail to meet the traffic demands of newly implemented networks.

Gigabit routing speeds are required for meeting the bandwidth demands of higher capacity networks. As optical networks are employed for higher density data traffic using increasingly more wavelengths per optical fiber, current architectures for routing switches are failing to meet the needs of this data traffic. In addition, the current generation of routing switches have become increasingly complex in the communication and computational overhead required among its internal components.

Therefore, it would be advantageous to have a method and apparatus for increasing the speed of a routing switch while decreasing the internal complexity of the component communication. It would be further advantageous if the architecture were scalable to meet the increasing demands of optical networks.

SUMMARY OF THE INVENTION

A methods apparatus, and instructions for processing packets within a routing switch uses a multiprocessor architecture. The routing switch includes a switch fabric, a Routing Table Processing Unit, at least one packet buffer for queuing incoming and outgoing packets, at least one Packet Processing Unit, and a shared memory for storing a routing table. A Packet Processing Unit retrieves packets from a packet buffer memory, which may be a shared memory accessible to more than one of the Packet Processing Units depending upon the internal configuration of the components. The Packet Processing Unit categorizes the packets into routing information packets and data packets. The Packet Processing Unit forwards a routing information packet to a Routing Table Processing Unit and processes any other data packet by retrieving forwarding information from a routing table, updating the packet with the retrieved forwarding information, and forwarding the updated packet using a switch fabric connected to the Packet Processing Unit. A locking mechanism within the routing table memory provides synchronization between the activities of the various processing units. In response to receiving a routing information packet, the Routing Table Processing Unit locks a portion of the routing table, updates the locked portion of the routing table with information from the routing table information packet, and then unlocks the locked portion of the routing table. The Packet Processing Unit waits for a necessary portion of the routing table to be unlocked before retrieving any forwarding information. If more than one packet buffer memory is employed, the routing switch may be configured to support a wavelength division multiplexed (WDM) enabled network such that each input/output interface receives packets over a particular wavelength and queues the packets within separate packet buffers.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
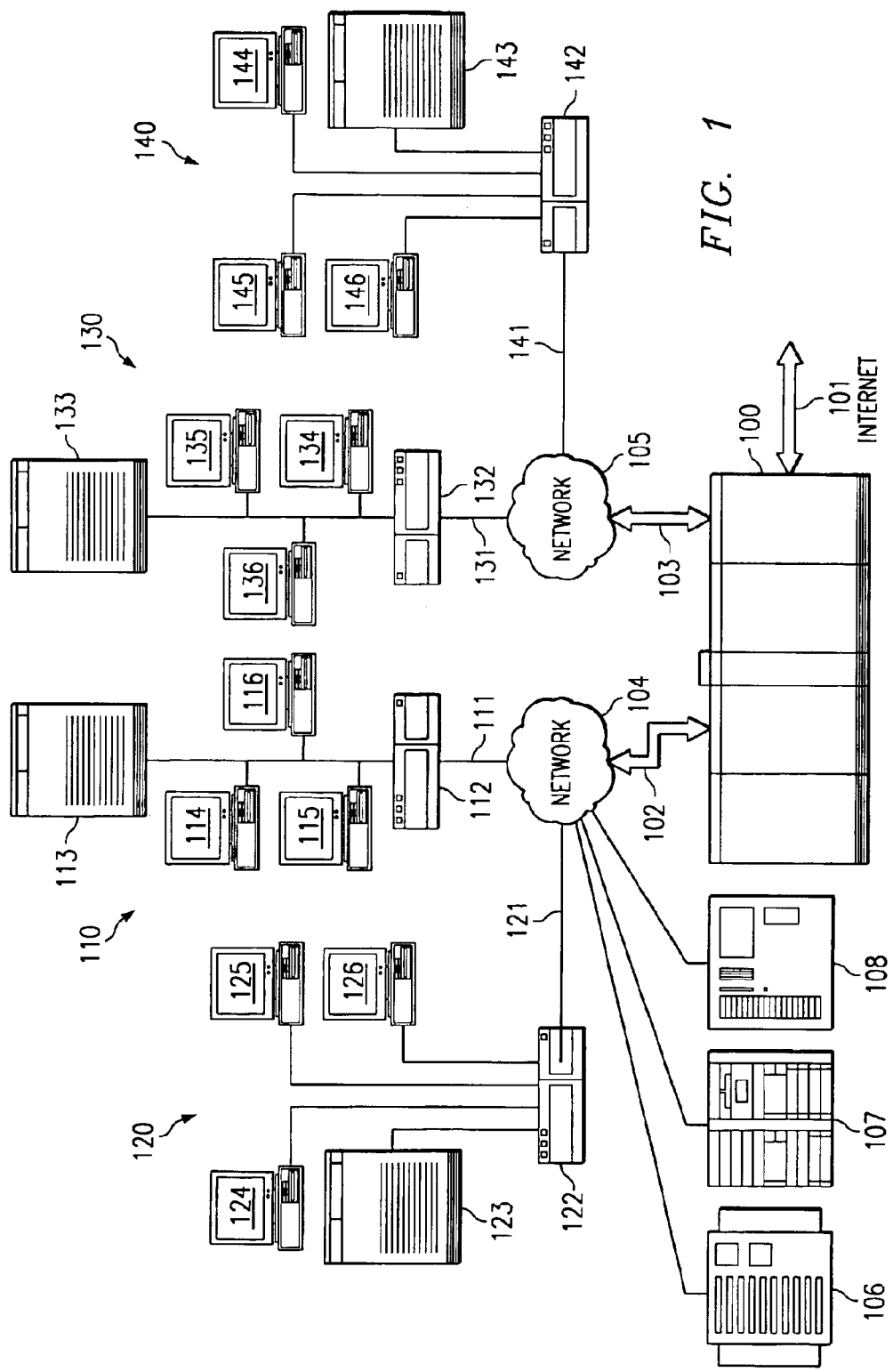
FIG. 1 is a pictorial representation of a distributed data processing system depicting a set of networks and internetwork connections in which the present invention may be implemented.

With reference now to FIG. 1, a pictorial representation of a distributed data processing system depicts a set of networks and internetwork connections in which the present invention may be implemented. Routing switch 100 is connected to the Internet via communications link 101. The Internet is a worldwide collection of networks and gateways that use the TCP/IP (Transport control Protocol/Internet Protocol) suite of protocols to communicate with one another. At the heart of the Internet is a backbone of high-speed data communication lines between major nodes or host computers consisting of thousands of commercial, government, educational, and other computer systems that route data and messages. Routing switch 100 is connected to network 104 by communications link 102, and routing switch 100 is connected to network 105 by communications link 103. Routing switch 100 provides a network interconnection between network 104, network 105 and the Internet.

Network 104 is connected to a variety of computing devices. In the example, network 104 provides networked capabilities to server 106, mainframe 107, and supercomputer 108. Subnetworks 110 and 120 are connected to network 104 through switches 112 and 122 via communication links 111 and 121. Subnetwork 110 is a shared media local access network (LAN) connecting server 113 to computers 114–116. Subnetwork 120 connects server 123 and PCs 124–126. Switches 112 and 122 may be Layer 2 switches that act essentially as multiport bridges. These switches may learn which network segment are connected to each of its ports by examining the incoming traffic, deducing the Layer 2 addresses of all stations attached to each port, and building a local forwarding table. This type of switch can increase the effective capacity of a LAN as multiple simultaneous transmissions can take place if the transmissions do not involve the same ports.

Network 105 connects subnetworks 130 and 140 through switches 132 and 142 via communication links 131 and 141. Subnetworks 130 and 140 are similar to subnetworks 110 and 120 respectively. Subnetwork 130 is a shared media LAN connecting server 133 and computers 134–136. Subnetwork 140 connects server 143 and computers 144–146.

Networks 104 and 105 may provide both high-speed and low-speed communications interfaces. Network 104 may contain a high-speed communications interface for communicating with supercomputer 108 in order to transfer large amounts of data. Networks 104 and 105 may include both permanent and temporary connections, such as modem connections made through a public telephone system. Permanent connections may include traditional wire, fiber optic cable, and wireless connections. The depicted example in FIG. 1 shows a representative set of interconnected networks and subnetworks. However, the depicted example is not meant to imply architectural limitations in any manner.

A router is a special computer that is dedicated to the task of interconnecting networks. In a heterogeneous environment using multiple types of networks, a connection device is essential for interconnecting two different technologies. As implied in the name, a router serves as a routing switchboard between networks. Routers connect two or more networks and forward data packets between the networks. When data arrives from one of the network segments, the router decides, according to a routing table, to which network segment the data should be forwarded. Even though each connection of a router is to one physical network, one network can connect to other networks through the use of other routers. In this manner, many networks can interconnect. In the example in FIG. 1, routing switch 100 forwards data between network 104, network 105, and the Internet.

Figure 2:
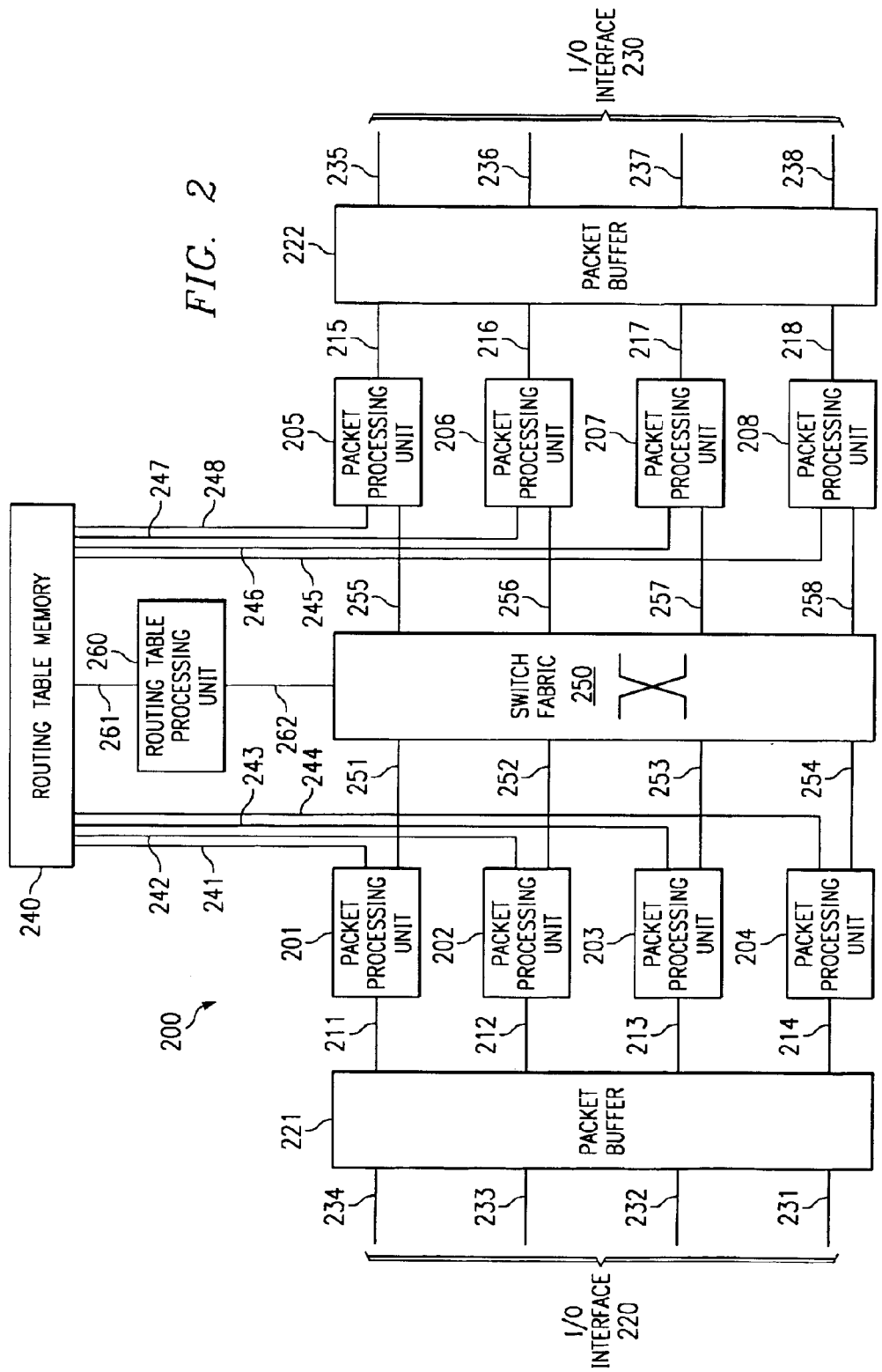
FIG. 2 is a routing switch depicted in accordance with a preferred embodiment of the present invention.

With reference now to FIG. 2, a routing switch is depicted in accordance with a preferred embodiment of the present invention. Routing switch 100 in FIG. 1 may contain the hardware architecture of routing switch 200 shown in FIG. 2. I/O interfaces 220 and 230 may represent interconnected networks such as networks 104, network 105, and the Internet shown in FIG. 1.

Packet Processing Units 201–208 are connected to packet buffers 221 and 222 via lines 211–218. Packet buffers 221 and 222 act as a shared memory for pooling packets received through I/O interfaces 220 and 230 via lines 231–238. Data packets, received from networks that are interconnected to routing switch 200, are temporarily stored in packet buffers 221 and 222 before the packets are processed by Packet Processing Units 201–208.

A Packet Processing Unit may comprise a central processing unit and an associated ship set that are configured as a data processing unit. Alternatively, a Packet Processing Unit may be configured as an application-specific integrated circuit (ASIC) that comprises the necessary circuitry for forwarding packets. In an alternative configuration, the Packet Processing Unit may comprise firmware-like instructions that are executed to perform the packet switching and routing functions. A configuration using instructions may be feasible depending upon a variety of factors: the desired speed of the routing switch; the amount of packet traffic; and the speed and bandwidth of the networks connected to the routing switch.

Lines 251–258 connect Packet Processing Units 201–208 to switch fabric 250. A Packet Processing Unit may forward a packet by sending the packet into fabric switch 250.

Packet Processing Units 201–208 are connected to routing table memory 240. Lines 241–248 connect Packet Processing Units 201–208 to this shared memory that stores the routing table for routing switch 200. Routing Table Processing Unit 260 is connected to routing table memory 240 through line 261 and is also connected to switch fabric 250 by line 262.

Routing is essentially moving information across an internetwork from a source to a destination. Typically, at least one intermediate node is encountered between the source and the destination. Routing is often contrasted with bridging, which seems to accomplish the same function. The primary difference between the two is that bridging occurs at Layer 2 (the link layer) of the OSI (Open Systems Interconnection) reference model, while routing occurs at Layer 3 (the network layer). Routing and bridging use different information in the process of moving information from the source to the destination. As a result, routing and bridging accomplish the different tasks in different ways using many different types of routing and bridging.

Routing involves two basic activities: determination of optimal routing paths and the transport of information units (typically called packets) through an internetwork, also referred to as switching. Switching may be relatively straightforward while path determination may be relatively complex. In the architecture of the preferred embodiment shown in FIG. 2, path determination is essentially completed within Routing Table Processing Unit 260 while switching is essentially completed within Packet Processing Units 201–208 and switch fabric 250. Traditionally, routing has been accomplished primarily in software while switching has been performed primarily by hardware. The most recent generation of so-called "routers" have combined the two functions within a single device or computer. In order to show that the preferred embodiment of the present invention accomplishes routing, i.e., path determination, and switching, the term "routing switch" is used. However, routing switch 200 may also be described as a "router".

Figure 3:
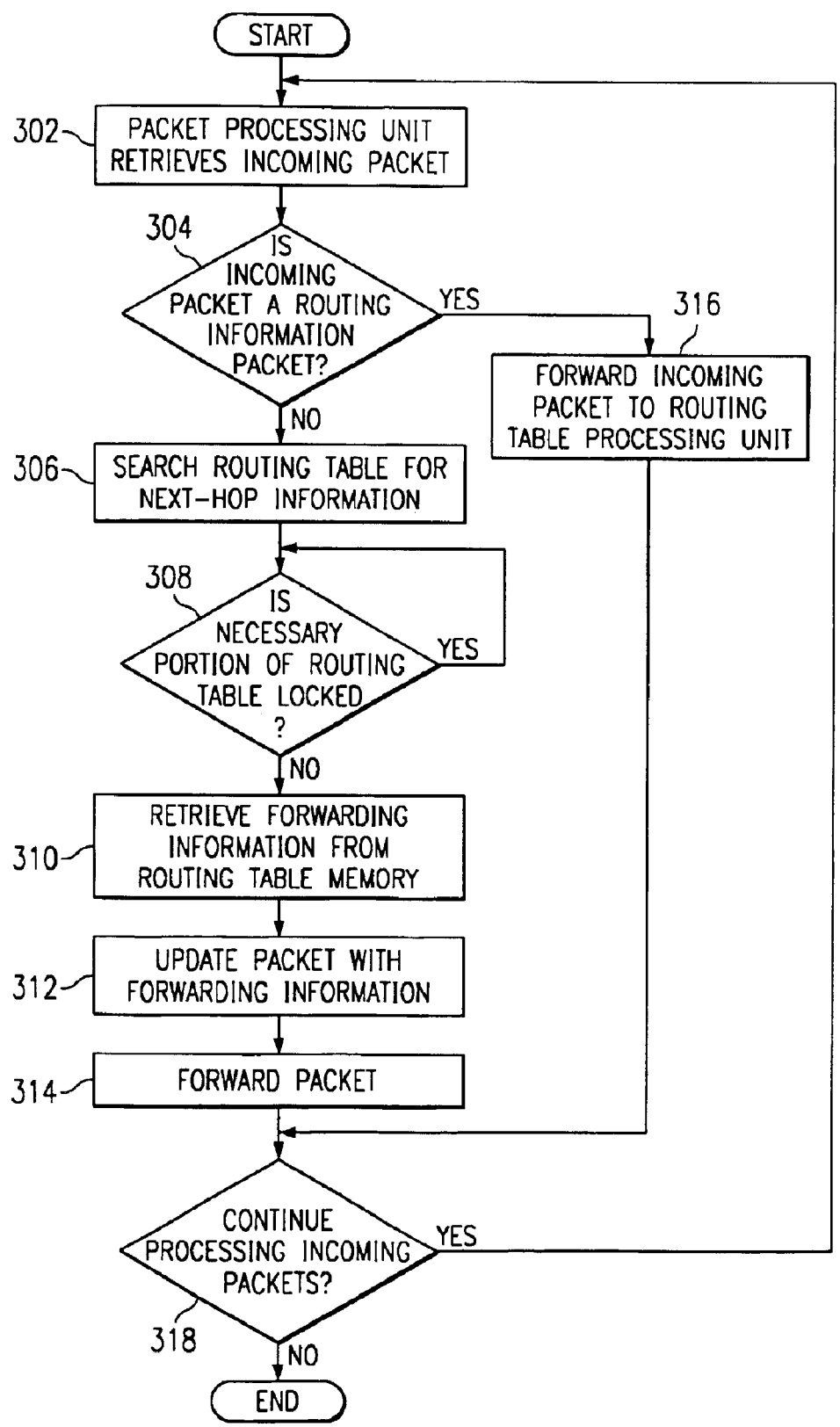
FIG. 3 is a flowchart depicting a method of transporting or forwarding packets through a routing switch.

With reference now to FIG. 3, a flowchart depicts a method of transporting or forwarding packets through a routing switch in accordance with a preferred embodiment of the present invention. The flowchart depicts the basic activity of a switching algorithm, and these steps may be completed within a data processing unit such as Packet Processing Units 201–208 in FIG. 2.

A Packet Processing Unit retrieves an incoming packet from the packet buffer (step 302) and determines whether the incoming packet is a routing information packet (step 304). If so, then the Packet Processing Unit forwards the incoming packet to the Routing Table Processing Unit (step 316). The Packet Processing Unit may then continue processing other incoming packets (step 318).

If the Packet Processing Unit determines that the incoming packet is not a routing information packet in step 304, the Packet Processing Unit searches the routing table for the next-hop information (step 306). A determination is then made as to whether the necessary portion of the routing table is locked (step 308). If so, then the Packet Processing Unit waits by continuing to check whether the necessary portion is locked. Once the necessary portion of the routing table is unlocked, the Packet Processing Unit then retrieves the necessary forwarding information from the routing table (step 310). The Packet Processing Unit may then update the packet with forwarding information (step 312). Once the packet is updated, the Packet Processing Unit forwards the packet into the switch fabric (step 314). A determination is then made as to whether the Packet Processing Unit should continue processing any incoming packets (step 318). If not, then the process completes. If the Packet Processing Unit should continue processing incoming packets, then the process returns to step 302 to repeat the process. Steps 302–318 define an essentially non-terminating loop.

In an IP routing device, the routing table is searched using the IP destination address as a key to determine which entry in the table represents the best route for a packet to take in its journey across the network to its destination. However, routing switch 200 may support many different network protocols other than IP. The Packet Processing Units may employ a variety of well-known search algorithms to search the routing table, and the choice of algorithm may depend upon the routing protocol being supported by routing switch 200.

Switching is relatively simple and is basically the same for most routing protocols. In most cases, a host computer determines that it must send a packet to another host computer.

In the IP protocol, switching occurs in the following manner. After acquiring a router's address by some means, the source host sends a packet address specifically to a router's physical (Media Access Control Layer or MAC Layer) address but with a protocol (network layer) address of the destination host. Upon examining the destination protocol address of the packet, the router determines that it either knows or does not know how to forward the packet to the next-hop. If the router does not know how to forward the packet, it typically drops the packet. If the router knows how to forward the packet, it changes the destination physical address currently in the packet to the destination physical address of the next-hop and transmits the packet. The next-hop may or may not be the ultimate destination host. If not, the next-hop is usually another router that executes the same switching decision process. As the packet moves through the internetwork, its physical address changes but its protocol address remains constant.

As described above with respect to FIG. 3, routing switch 200 executes a switching algorithm within the Packet Processing Units 201–208. A Packet Processing Unit updates a packet by placing the correct forwarding information into the packet. However, the switching algorithm within the Packet Processing Unit may be modified so that routing switch 200 can perform packet switching on many different types of packets not limited only to packets transported according to the TCP/IP protocol.

Figure 4:
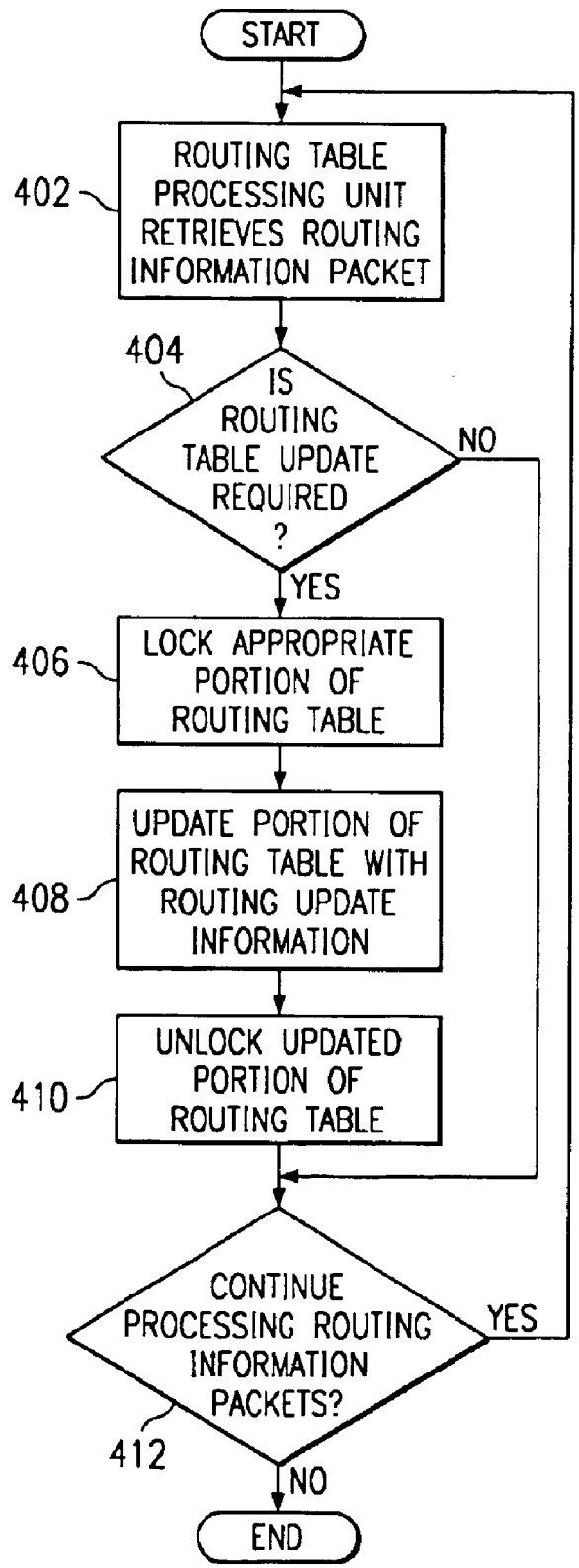
FIG. 4 is a flowchart depicting a method of updating a routing table in support of a process for determining an optimal routing path.

With reference now to FIG. 4, a flowchart depicts a method of updating a routing table in support of a process for determining an optimal routing path. The flowchart depicts the basic activity of preparing for a path determination through a network, and these steps may be completed within a data processing unit such as Routing Table Processing Unit 260 in FIG. 2.

The process begins when the Routing Table Processing Unit retrieves a routing information packet (step 402). The Packet Processing Units forward the routing information packets to the Routing Table Processing Unit upon a determination of the type of incoming packet. The Routing Table Processing Unit then determines whether an update of the routing table is required according to the content of the routing information packet (step 404). If a routing table update is required, the Routing Table Processing Unit locks the appropriate portion of the routing table (step 406) and updates the portion of the routing table with the routing update information (step 408). The Routing Table Processing Unit then unlocks the updated portion of the routing table (step 410) and determines whether there are other routing information packets that need to be processed (step 412). If so, then the process returns to step 402 in order to continue processing other routing information packets. If not, then the process terminates. If the Routing Table Processing Unit determines that an update of the routing table is not required in step 404, then the Routing Table Processing Unit skips over steps 406–410 to determine whether there are any other routing information packets. In this manner, steps 402–412 define the core steps of an essentially non-terminating loop.

Routers communicate with one another and maintain their routing tables through the transmission of a variety of routing update messages or routing information packets. Routing updates generally consist of all or a portion of a routing table. By analyzing routing updates received from other routers, a router can build a detailed picture of the current network topology. A link-state advertisement is one type of a routing information packet that is sent between routers. Link-state advertisements inform other routers of the state of the sender's links. Link information can also be used to build a complete picture of the current network topology. Once the current network topology is understood, routers can determine optimal routes to networks destinations.

Routing algorithms fill routing tables with a variety of information. Destination/next-hop associations tell a router that a particular destination can be gained optimally by sending the packet to a particular router representing the next-hop on the way to the final destination. When a router receives an incoming packet, it checks the destination address and attempts to associate this address with a next-hop.

Routing tables generally depend on the routing algorithm being used within a router. A simple model explains most Internet based routing. Each entry in a routing table has at least two fields: IP address prefix and next-hop. The next-hop is an IP address of another host or router that is directly reachable from the router via a physical connection to the router. The IP address prefix specifies a set of destinations for which the routing entry is valid according to the IP addressing scheme. If no routing table entry matches a destination address for the packet being processed, the packet is generally discarded as undeliverable. To avoid needing routing entries for every possible Internet destination, most hosts and routers use a default route that will only be used if there are no other matches in the routing table.

Commonly, a third field is found within a routing table entry. The third field specifies the I/O interface or physical exit port number of the routing switch through which the packet being forwarded should be sent in order to be directed optimally towards its destination. This type of entry would be found in a routing table of a router or routing switch that performs both path determination and switching.

The architecture of routing switch 200 in FIG. 2 provides flexibility in supporting a variety of routing update algorithms within Routing Table Processing Unit 260. Routing algorithms generally use many different metrics to determine a best route to be stored in a routing table. Path length is the most common routing metric and identifies the sum of the costs associated with each link traversed. Some routing protocols define a hop count that specifies the number of passes through an internetworking device, such as a router, that a packet must traverse from a source to a destination. Routing delay refers to the length of time required to move a packet from a source to a destination through an internetwork. Delay depends on many factors, including the bandwidth of intermediate network lengths, the port queues at each router along the way, network congestion on all intermediate network links, and the physical distance to be traveled. These metrics may be used by a variety of routing algorithms. The architecture of routing switch 200 allows any of these metrics to be used within a routing algorithm without effecting the design of routing switch 200.

The architecture of the routing switch described with respect to FIGS. 2–4 provides increased packet throughput in connecting a variety of networks. The arrangement of multiple processors for forwarding the incoming packets increases the efficiency of forwarding the packets. At the same time, the arrangement of the Packet Processing Units reduces the complexity that is generally inherent in any multiprocessing environment.

For example, in most multiprocessing systems, a significant amount of overhead is used to provide concurrency control and synchronization between each of the processors in the multiprocessing system. Within the architecture of the present invention, however, locking and synchronization are required only when the routing table updates occur. Each Packet Processing Unit is allowed to act as if it is the only processor in the routing switch with respect to forwarding and incoming packets. A Packet Processing Unit does not need the state of the forwarding transactions for any other Packet Processing Unit within the system. Most of the incoming packets are forwarded without contention with the processing of other packets. A single Packet Processing Unit may perform the complete processing of an individual packet, i.e., receiving the packet, modifying the packet, and forwarding the packet.

Most of the resources that are shared amongst the Packet Processing Units are for reading some type of information. The synchronization between the multiple Packet Processing Units is focused on the update of the routing table, which is an activity that must occur within any type of router. Locking a portion of a table is a standard database procedure that is well known. By using the locking mechanism as a concurrency and synchronization control mechanism in a routing switch, the complexity of communication among the Packet Processing Units is greatly reduced.

In addition, because the synchronization and concurrency is focussed on one particular location within the routing switch, the architecture of the present invention is inherently scalable. The routing switch may be configured for additional Packet Processing Units as long as appropriate capacity is added in the switch fabric and the packet I/O buffers.

Figure 5:
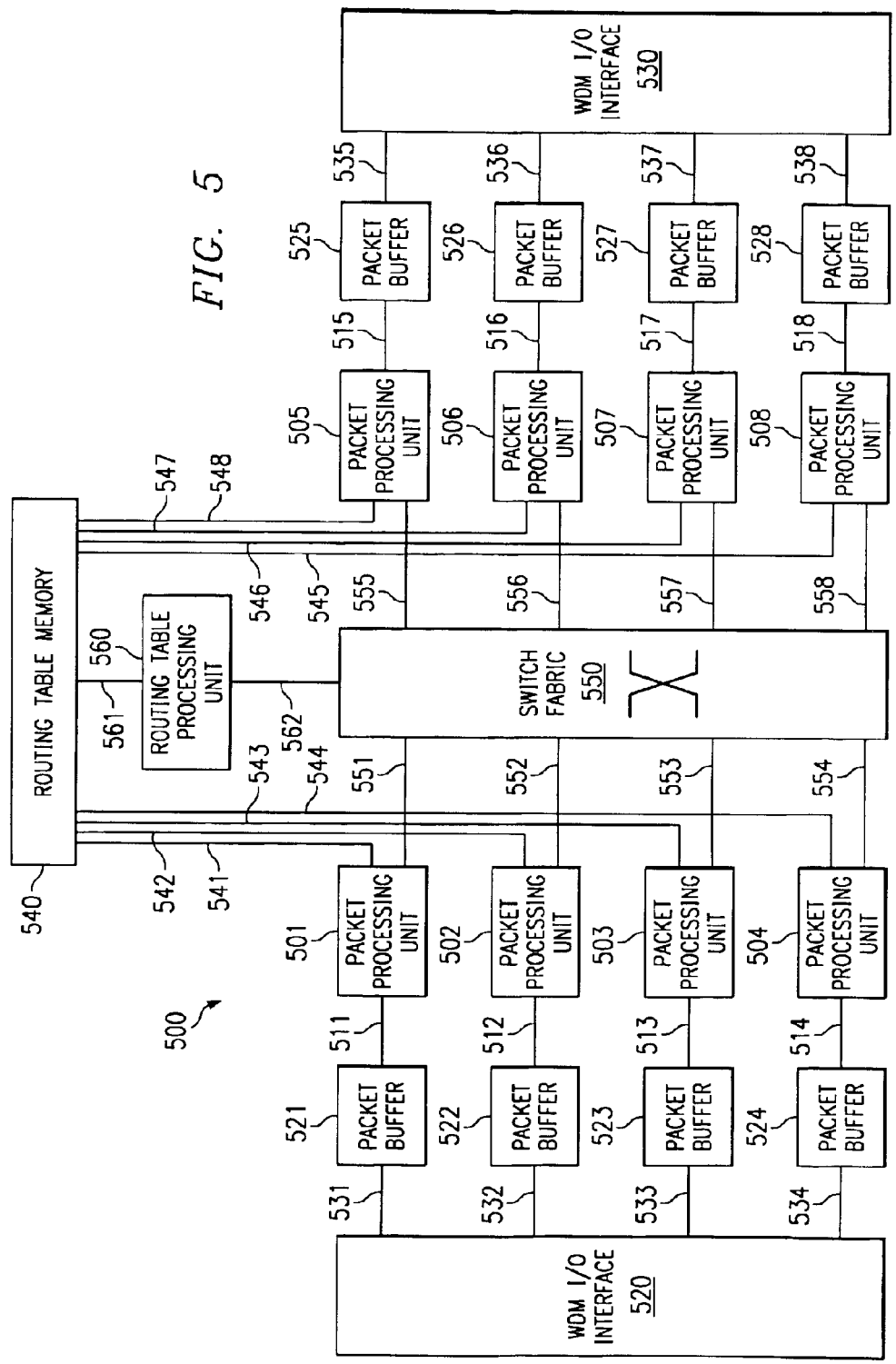
FIG. 5 is a first example of a routing switch configured for use with a WDM-enabled network in accordance with a preferred embodiment of the present invention.

With reference now to FIG. 5, a first example of a routing switch configured for use with an WDM-enabled network is depicted in accordance with a preferred embodiment of the present invention. Routing switch 500 shown in FIG. 5 is similar to routing switch 200 shown in FIG. 2 but has been modified to include a packet buffer for each Packet Processing Unit. WDM I/O interfaces 520 and 530 may represent interconnected networks such as networks 104, network 105, and the Internet shown in FIG. 1. Alternatively, I/O interfaces 520 and 530 may interface with other broadband networks, optical networks using other protocols, or other types of networks.

Packet Processing Units 501–508 are connected to packet buffers 521–528 via lines 511–218. Packet buffers 521–528 queue packets received through I/O interfaces 520 and 530 via lines 531–538. Data packets, received from networks that are interconnected to routing switch 500, are temporarily stored in packet buffers 521–528 before the packets are processed by Packet Processing Units 501–508. Lines 551–558 connect Packet Processing Units 501–508 to switch fabric 550.

Packet Processing Units 501–508 are connected to routing table memory 540. Lines 541–548 connect Packet Processing Units 501–508 to this shared memory that stores the routing table for routing switch 500. Routing Table Processing Unit 560 is connected to routing table memory 540 through line 561 and is also connected to switch fabric 550 by line 562.

With the configuration of packet buffers 521–528 in routing switch 500, different input/output policies may be implemented in accepting and buffering packets between the input/output interfaces and the packet buffers. Interfaces 520 and 530 may implement a different algorithm with respect to each input/output channel without affecting the architecture and communication of Packet Processing Units 501–508 and the Routing Table Processing Unit 560.

Figure 6:
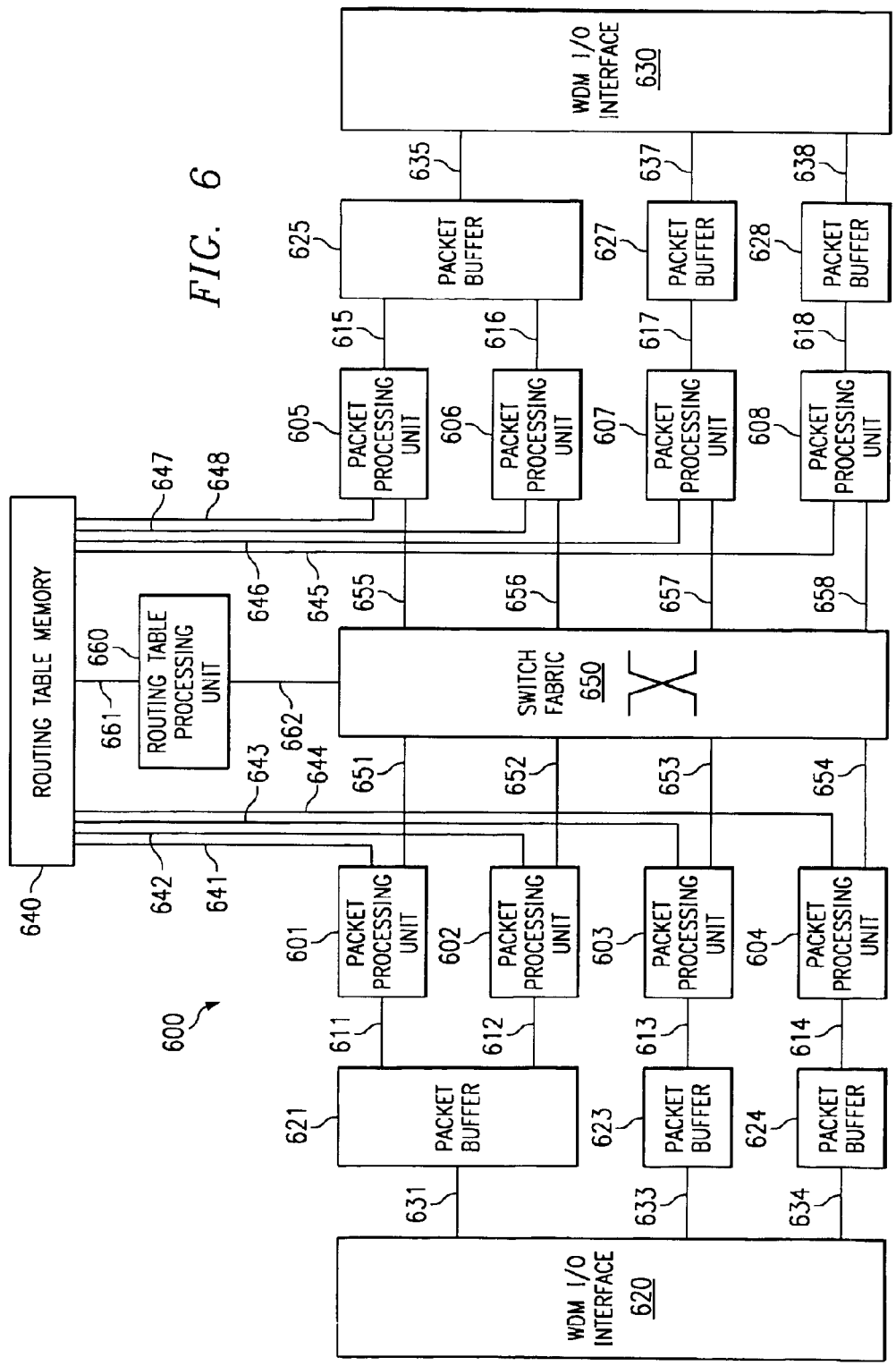
FIG. 6 is a second example of a routing switch configured for use with an WDM-enabled network in accordance with a preferred embodiment of the present invention.

With reference now to FIG. 6, a second example of a routing switch configured for use with an WDM-enabled network is depicted in accordance with a preferred embodiment of the present invention. Routing switch 600 shown in FIG. 6 is similar to routing switch 200 shown in FIG. 2 but has been modified to include a particular arrangement of multiple packet buffers. WDM I/O interfaces 520 and 530 may represent interconnected networks such as networks 104, network 105, and the Internet shown in FIG. 1. Alternatively, I/O interfaces 620 and 630 may interface with other broadband networks, optical networks using other protocols, or other types of networks.

Packet Processing Units 601–608 are connected to packet buffers 621, 623, 624, 625, 627, and 628 via lines 611–618. Lines 651–658 connect Packet Processing Units 601–608 to switch fabric 650. Packet buffers 621, 623, 624, 625, 627, and 628 queue packets received through I/O interfaces 620 and 630 via lines 631, 633, 634, 635, 637, and 638. Data packets, received from networks that are interconnected to routing switch 600, are temporarily stored in packet buffers 621, 623, 624, 625, 627, and 628 before the packets are processed by Packet Processing Units 601–608.

Packet Processing Units 601–608 are connected to routing table memory 640. Lines 641–648 connect Packet Processing Units 601–608 to this shared memory that stores the routing table for routing switch 600. Routing Table Processing Unit 660 is connected to routing table memory 640 through line 661 and is also connected to switch fabric 650 by line 662.

Routing switch 600 has packet buffer 621 that is connected to Packet Processing Units 601 and 602. Packet buffer 625 is connected to Packet Processing Unit 605 and 606. Packet buffers 623, 624, 627, and 628 are connected to Packet Processing Units 603, 604, 607, and 608. With this configuration, more Packet Processing Units have been allocated to packet buffers 621 and 625 so that a greater percentage of the packet processing resources can be applied to packet streams received in association with these particular packet buffers.

An important aspect of FIGS. 5 and 6 is that the I/O interfaces may be modified without modifying the core architecture of the depicted routing switch. The computational overhead and complexities of synchronizing a multi-processor routing switch have been minimized by ensuring that each Packet Processing Unit may proceed with the complete processing of a retrieved packet without regard to the state of any other Packet Processing Unit.

Another important feature of the routing switch of the present invention provides flexibility for interfacing the routing switch with an WDM-enabled network. Each input/output channel may be devoted to a particular wavelength without committing the entire architecture to a predetermination of a particular wavelength for a particular use.

In the example routing switch in FIG. 5, WDM I/O interfaces 520 and 530 may allocate a packet stream on a particular wavelength to a particular packet buffer for each operational wavelength. In the example routing switch in FIG. 6, WDM I/O interfaces 620 and 630 may allocate a plurality of packet streams from multiple wavelengths to a single packet buffer, such as packet buffers 621 and 625. The WDM I/O interfaces may use a variety of buffer allocation algorithms without affecting the relationships between the Packet Processing Units and the Routing Table Processing Unit.

Selection rules for differentiated services may be implemented within the input/output interfaces without affecting the architecture of the routing switch. Differentiated services may include identifying sources or destinations of particular users or systems. For example, a source that is multicasting a packet stream may be given higher priority to ensure that the packets are received downstream within particular time limits. As another example, a broadcast from a government agency may be given higher priority than common e-mail traffic.

Another criteria may be the type of application generating or consuming a particular packet stream. In this category, a video application that is generating large amounts of data, thus representing a higher revenue source, may be given higher quality service. Another example may be higher paying customers versus lower paying customers in which higher paying customers are given higher priority data streams with higher throughput.

In each of these examples, different quality of service determinations may be made and provided based on hardware support for a particular wavelength. The architecture of the routing switch of the present invention supports the wavelength-based policy without committing the design of the routing switch to any particular policy.

What is claimed is:

1. A method for processing packets in a communications device, the method comprising the steps of:
    retrieving a packet from a packet buffer memory by a packet processing unit, wherein the packet processing unit is one of a plurality of packet processing units, wherein the packet buffer memory is one of a plurality of packet buffer memories, and wherein each packet buffer memory is connected with one of the plurality of packet processing units;
    determining a packet type for the packet;
    forwarding the packet to a Routing Table Processing Unit if the packet type is determined to be a routing information packet;
    retrieving forwarding information from a routing table if the packet is determined not to be a routing information packet, wherein the routing table is stored in a second shared memory connected to the plurality of packet processing units;
    updating the packet with the retrieved forwarding information; and
    forwarding the updated packet.

2. A method for processing packets in a communications device, the method comprising the steps of:
    retrieving a packet from a first shared memory by a packet processing unit, wherein the packet processing unit is one of a plurality of packet processing units connected to the first shared memory;
    determining a packet type for the packet;
    forwarding the packet to a Routing Table Processing Unit if the packet type is determined to be a routing information packet;
    retrieving forwarding information from a routing table if the packet is determined not to be a routing information packet, wherein the routing table is stored in a second shared memory connected to the plurality of packet processing units;
    updating the packet with the retrieved forwarding information; and
    forwarding the updated packet.

3. The method of claim 2 wherein a packet is forwarded by using a switch fabric connected to the plurality of packet processing units.

4. The method of claim 3 wherein the routing table processing unit is connected to the switch fabric.

5. The method of claim 2 further comprising:
    in response to receiving a routing information packet, locking a portion of the routing table by the routing table processing unit;
    updating the locked portion of the routing table with information from the routing table information packet; and
    unlocking the locked portion of the routing table.

6. The method of claim 2 wherein the step of retrieving forwarding information from a routing table further comprises:
    searching the routing table;
    determining if a portion of the routing table is locked;
    waiting for the portion of the routing table to be unlocked; and
    retrieving the forwarding information when the portion of the routing table is unlocked.

7. The method of claim 2 wherein the communications device interfaces with a wavelength division multiplexed (WDM) enabled network, and wherein the first shared memory stores packets transmitted on a single wavelength on the WDM-enabled network.

8. The method of claim 7 further comprising:
    providing differentiated service processing of packets based on a placement of a packet in one of a plurality of shared packet buffer memories, wherein the first shared memory is one of the plurality of shared packet buffer memories.

9. The method of claim 8 wherein the differentiated service processing comprises quality-of-service differentiation.

10. An apparatus for processing packets in a communications device, the apparatus comprising:
    a first retrieving means for retrieving a packet from a packet buffer memory by a packet processing unit, wherein the packet processing unit is one of a plurality of packet processing units, wherein the packet buffer memory is one of a plurality of packet buffer memories, and wherein each packet buffer memory is connected with one of the plurality of packet processing units;

determining means for determining a packet type for the packet;

a first forwarding means for forwarding the packet to a Routing Table Processing Unit if the packet type is determined to be a routing information packet;

a second retrieving means for retrieving forwarding information from a routing table if the packet is determined not to be a routing information packet, wherein the routine table is stored in a second shared memory connected to the plurality of packet processing units;

updating means for updating the packet with the retrieved forwarding information; and a second forwarding means for forwarding the updated packet.

11. An apparatus for processing packets in a communications device, the apparatus comprising:

a first retrieving means for retrieving a packet from a first shared memory by a packet processing unit, wherein the packet processing unit is one of a plurality of packet processing units connected to the first shared memory;

determining means for determining a packet type for a packet retrieved from the first shared memory;

a first forwarding means for forwarding the retrieved packet to a routing table processing unit if the packet type is determined to be a routing information packet;

a second retrieving means for retrieving means for retrieving forwarding information from a routing table if the retrieved packet is determined not to be a routing information packet;

updating means for updating the retrieved packet, wherein the routing table is stored in a second shared memory connected to the plurality of packet processing units; with the retrieved forwarding information; and a second forwarding means for forwarding the updated packet.

12. The apparatus of claim 11 further comprising a switch fabric connected to the plurality of packet processing units.

13. The apparatus of claim 12 wherein the routing table processing unit is connected to the switch fabric.

14. The apparatus of claim 11 wherein the second retrieving means further comprises:

searching means for searching the routing table;

determining means for determining if a portion of the routing table is locked;

waiting means for waiting for the portion of the routing table to be unlocked before retrieving the forwarding information.

15. The apparatus of claim 11 wherein the routing table processing unit further comprises:

locking means for locking a portion of the routing table in response to receiving a routing information packet;

updating means for updating the locked portion of the routing table with information from the routing table information packet; and unlocking means for unlocking the locked portion of the routing table.

16. The apparatus of claim 11 wherein the communications device interfaces with a wavelength division multiplexed (WDM) enabled network, and wherein the first shared memory stores packets transmitted on a single wavelength on the WDM-enabled network.

17. The apparatus of claim 16 further comprising:

a plurality of shared packet buffer memories, wherein the first shared memory is one of the plurality of shared packet buffer memories; and differentiated processing means for providing differentiated service processing of packets based on a placement of a packet in one of the plurality of shared packet buffer memories.

18. A computer program product in a computer readable medium for processing packets in a communication system, the computer program product comprising:

first instructions for retrieving a packet from a first shared memory by a packet processing unit, wherein the packet processing unit is one of a plurality of packet processing units connected to the first shared memory;

second instructions for determining a packet type for the packet;

third instructions for forwarding the packet to a routing table processing unit if the packet type is determined to be a routing information packet;

fourth instructions for retrieving forwarding information from a routing table if the packet is determined not to be a routing information packet, wherein the routing table is stored in a second shared memory connected to the plurality of packet processing units;

fifth instructions for updating the packet with the retrieved forwarding information; and sixth instructions for forwarding the updated packet.

19. The computer program product of claim 18 further comprising:

seventh instructions for locking a portion of the routing table by the routing table processing unit in response to receiving a routing information packet;

eighth instructions for updating the locked portion of the routing table with information from the routing table information packet; and ninth instructions for unlocking the locked portion of the routing table.

20. The computer program product of claim 18 wherein the fourth instructions for retrieving forwarding information from a routing table further comprises:

tenth instructions for searching the routing table;

eleventh instructions for determining if a portion of the routing table is locked;

twelfth instructions for waiting for the portion of the routing table to be unlocked; and thirteenth instructions for retrieving the forwarding information when the portion of the routing table is unlocked.

21. The computer program product of claim 18 wherein the communication system comprises a wavelength division multiplexed (WDM) enabled network, and wherein the first shared memory stores packets transmitted on a single wavelength on the WDM enabled network.

* * * * *

UNITED STATES PATENT AND TRADEMARK OFFICE
CERTIFICATE OF CORRECTION

PATENT NO. : 6,947,415 B1
DATED : September 20, 2005
INVENTOR(S) : Nagaraj

It is certified that error appears in the above-identified patent and that said Letters Patent is hereby corrected as shown below:

<u>Column 11,</u>
Line 13, before "table" delete "routine" and insert -- routing --.

Signed and Sealed this

Twenty-third Day of May, 2006

JON W. DUDAS
*Director of the United States Patent and Trademark Office*